US009210298B2

(12) United States Patent
Zaima

(10) Patent No.: US 9,210,298 B2
(45) Date of Patent: Dec. 8, 2015

(54) IMAGE FORMING APPARATUS WHICH PERFORMS CALIBRATION FOR MAINTAINING IMAGE QUALITY

(71) Applicant: CANON KABUSHIKI KAISHA, Tokyo (JP)

(72) Inventor: Nobuhiko Zaima, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/566,757

(22) Filed: Dec. 11, 2014

(65) Prior Publication Data
US 2015/0092206 A1    Apr. 2, 2015

Related U.S. Application Data

(63) Continuation of application No. 13/159,772, filed on Jun. 14, 2011, now Pat. No. 8,947,728.

(30) Foreign Application Priority Data

Jul. 21, 2010    (JP) .................................. 2010-164348

(51) Int. Cl.
*H04N 1/60*    (2006.01)
(52) U.S. Cl.
CPC ............ *H04N 1/6097* (2013.01); *H04N 1/6033* (2013.01); *H04N 2201/0081* (2013.01); *H04N 2201/0094* (2013.01)
(58) Field of Classification Search
CPC .............. H04N 1/6097; H04N 1/6033; H04N 2201/0081; H04N 2201/0094
See application file for complete search history.

(56) References Cited

U.S. PATENT DOCUMENTS 6,034,788 A    3/2000    Sasanuma et al.
6,297,873 B1    10/2001    Furuya
(Continued)

FOREIGN PATENT DOCUMENTS

DE    69517459 T2    2/2001
EP    0674427 A2    9/1995
(Continued)

OTHER PUBLICATIONS

Chinese Office Action dated Oct. 31, 2013, issued in corresponding Chinese Patent Application No. 201110206607.1, with an English translation.
(Continued)

*Primary Examiner* — King Poon
*Assistant Examiner* — Andrew H Lam
(74) *Attorney, Agent, or Firm* — Fitzpatrick, Cella, Harper & Scinto

(57) ABSTRACT

An image forming apparatus includes a correcting unit that corrects image data using a tone correction condition. An image forming unit forms an image on a printing medium based on the corrected image data. An obtaining unit obtains read data by a reading unit reading a pattern image formed on the medium by the image forming unit. A converting unit converts the read data into density data using a converting condition corresponding to the printing medium. A first creating unit creates the tone correction condition based on the density data converted by the converting unit. A second creating unit controls the correcting unit to correct the patch data using the tone correction condition created by the first creating unit, controls the image forming unit to form a patch image on another printing medium based on the corrected patch data, and creates the converting condition corresponding to the other printing medium.

8 Claims, 12 Drawing Sheets

(56) References Cited

U.S. PATENT DOCUMENTS

| | | |
|---|---|---|
| 6,456,803 B2 | 9/2002 | Suzuki et al. |
| 6,999,199 B2 | 2/2006 | Degani et al. |
| 7,385,737 B2 | 6/2008 | Zaima |
| 7,433,101 B2 | 10/2008 | Jacob et al. |
| 7,580,647 B2 | 8/2009 | Komiya |
| 7,619,792 B2 | 11/2009 | Itagaki et al. |
| 7,903,287 B2 | 3/2011 | Itagaki et al. |
| 7,930,287 B2 | 4/2011 | Galvin et al. |
| 8,107,127 B2 | 1/2012 | Itagaki et al. |
| 8,130,409 B2 | 3/2012 | Itagaki et al. |
| 2002/0085235 A1 | 7/2002 | Degani et al. |
| 2005/0007609 A1 | 1/2005 | Itagaki et al. |
| 2005/0225784 A1 | 10/2005 | Jacob et al. |
| 2007/0019975 A1* | 1/2007 | Komiya .......................... 399/49 |
| 2007/0229923 A1 | 10/2007 | Itagaki et al. |
| 2012/0020680 A1 | 1/2012 | Zaima |

FOREIGN PATENT DOCUMENTS

| | | |
|---|---|---|
| JP | H07-261479 A | 10/1995 |
| JP | H08-287217 A | 11/1996 |
| JP | 2007-272112 A | 10/2007 |

OTHER PUBLICATIONS

Japanese Office Action dated Apr. 4, 2014, issued in corresponding Japanese Patent Application No. 2010-164348.
Communication and European Search Report dated Oct. 24, 2011, issued in corresponding European Patent Application No. 11170658.6-2202.

* cited by examiner

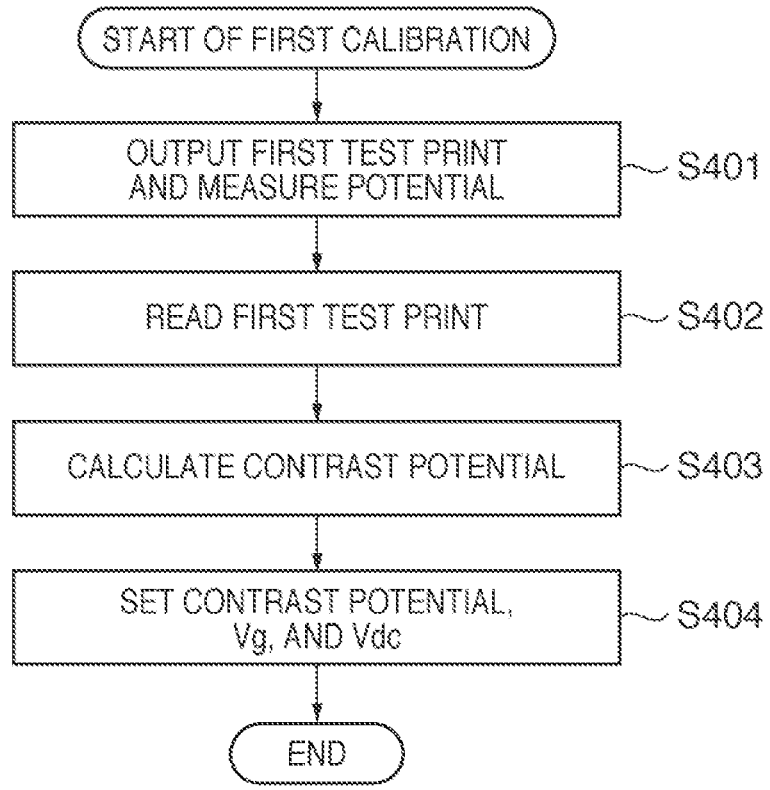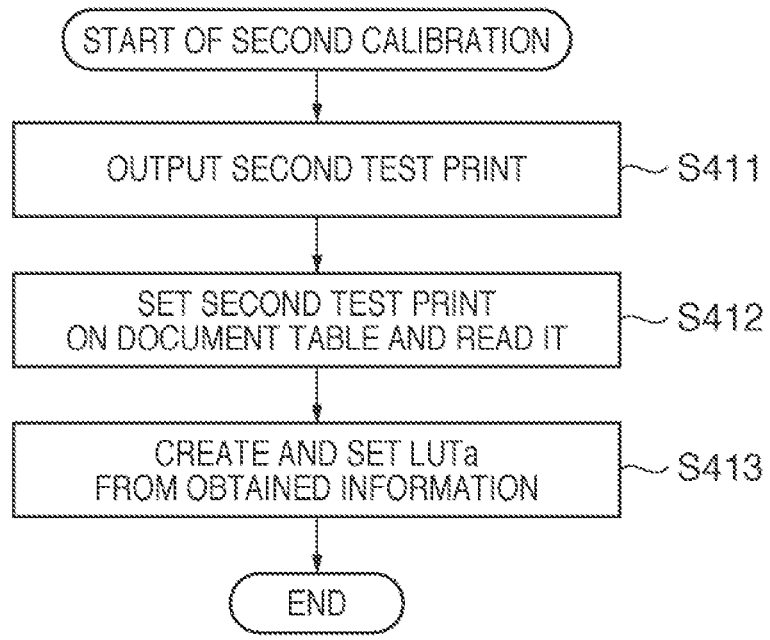

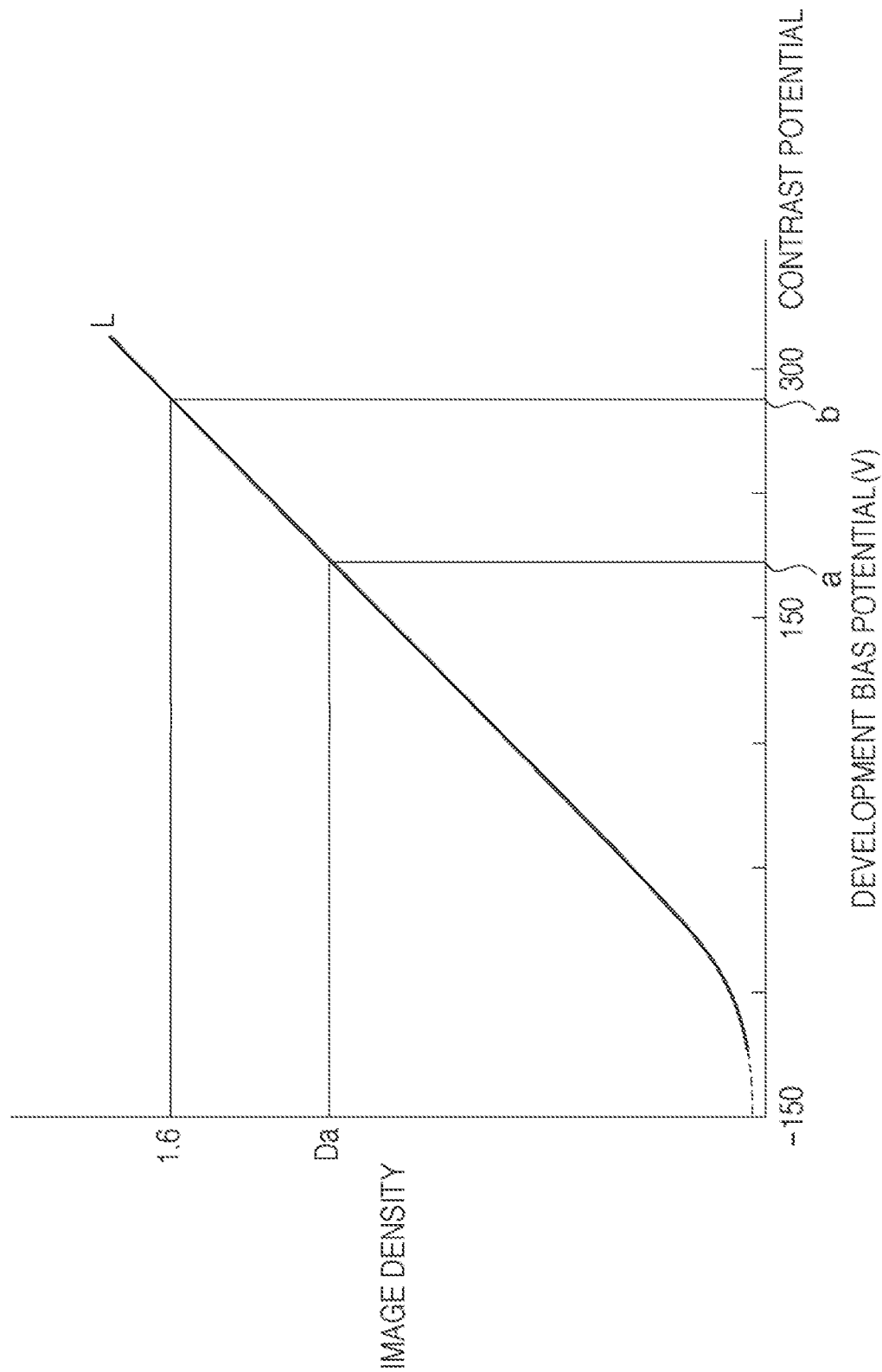

IMAGE FORMING APPARATUS WHICH PERFORMS CALIBRATION FOR MAINTAINING IMAGE QUALITY

This application is a continuation application of copending U.S. patent application Ser. No. 13/159,772, filed Jun. 14, 2011, and which published as U.S. Patent Application Publication No. 2012/0019845 A1 on Jan. 26, 2012.

BACKGROUND OF THE INVENTION

1. Field of the Invention

The present invention relates to calibration for maintaining the image quality.

2. Description of the Related Art

The image quality of an image forming apparatus varies depending on its use environment and use condition. The image quality also varies depending on the type of printing medium to be used. It is therefore necessary to change the image conversion conditions and image forming conditions depending on the environment and use condition (Japanese Patent Laid-Open No. 07-261479). In some cases, image conversion conditions and image forming conditions need to be added in accordance with the type of printing medium to be used (Japanese Patent Laid-Open No. 08-287217).

The invention in Japanese Patent Laid-Open No. 07-261479 assumes the use of a specific type of printing medium (to be referred to as the first printing medium) for calibration each time. If the first printing medium runs out, no calibration can be performed. Even in the invention of Japanese Patent Laid-Open No. 08-287217, performing calibration for an added arbitrary type of printing medium (to be referred to as the second printing medium) requires that a printing medium of the same type prepared each time. This is because the calibration aims to maintain the tone characteristic for the added second printing medium. If calibration is performed using the second printing medium of a type different from the first printing medium, for example, the amount of applied toner may become insufficient or exceed a permissible range designed for the image formation apparatus. This means that the image quality cannot be maintained. It would be convenient for the operator if calibration for a desired printing medium can be performed using another type of printing medium. For example, the use of an OHT (Overhead Transparency) sheet is designated for calibration for maintaining the tone characteristic for the OHT sheet. However, making plain paper usable for calibration to maintain the tone characteristic for the OHT sheet brings about significant advantages to the operator.

SUMMARY OF THE INVENTION

It is a feature of the present invention to solve at least one of the above problems and other problems. For example, it is a feature of the present invention to perform calibration for a desired printing medium by using another type of printing medium. Note that other problems will be understood throughout the specification.

The present invention provides an image forming apparatus may comprise the following elements. An image forming unit forms a pattern image on a printing medium. A first conversion unit converts a luminance value (i(X)) obtained from the pattern image formed on a first printing medium into a corresponding density value (d(X)) on the first printing medium. A second conversion unit converts a luminance value (i(Z)) obtained from the pattern image formed on a second printing medium different from the first printing medium into a corresponding density value (d(X)) on the first printing medium. A first creation unit creates a first image processing condition (LUTa) to be applied to form an image on the printing medium by using the density value (d(X)) obtained by the first conversion unit when forming the pattern image on the first printing medium or using the density value (d(X)) obtained by the second conversion unit when forming the pattern image on the second printing medium.

Further features of the present invention will become apparent from the following description of exemplary embodiments (with reference to the attached drawings).

BRIEF DESCRIPTION OF THE DRAWINGS

FIGS. 4A and 4B show flowchart showing contrast potential calculation processing in the first calibration and flowchart showing the second calibration, respectively;

FIG. 6 is a graph showing the relationship between the contrast potential and the image density value;

DESCRIPTION OF THE EMBODIMENTS

Preferred embodiments of the present invention will be described below. Individual embodiments to be described below would aid in understanding of various concepts such as superordinate, intermediate, and subordinate concepts of the invention. The technical scope of the present invention is defined by the scope of the appended claims, and is not limited by the following individual embodiments.

First Embodiment

An embodiment applied to an electrophotographic color copying machine will be explained below. Note that the present invention is applicable to any image formation apparatus that needs calibration. The image formation scheme is not limited to electrophotography, and may be inkjet printing, electrostatic printing, and any other scheme. The present invention is applicable not only to an image formation apparatus for forming a multicolor image but also to an image formation apparatus for forming a single-color image. The image formation apparatus may be commercially available as, for example, a printing apparatus, printer, copying machine, multifunction peripheral, or facsimile apparatus.

The printing medium is also called printing paper, printing material, paper, sheet, transfer material, or transfer paper. The printing medium can be made of paper, fiber, film, or resin.

<Basic Hardware Configuration>

Figure 1:
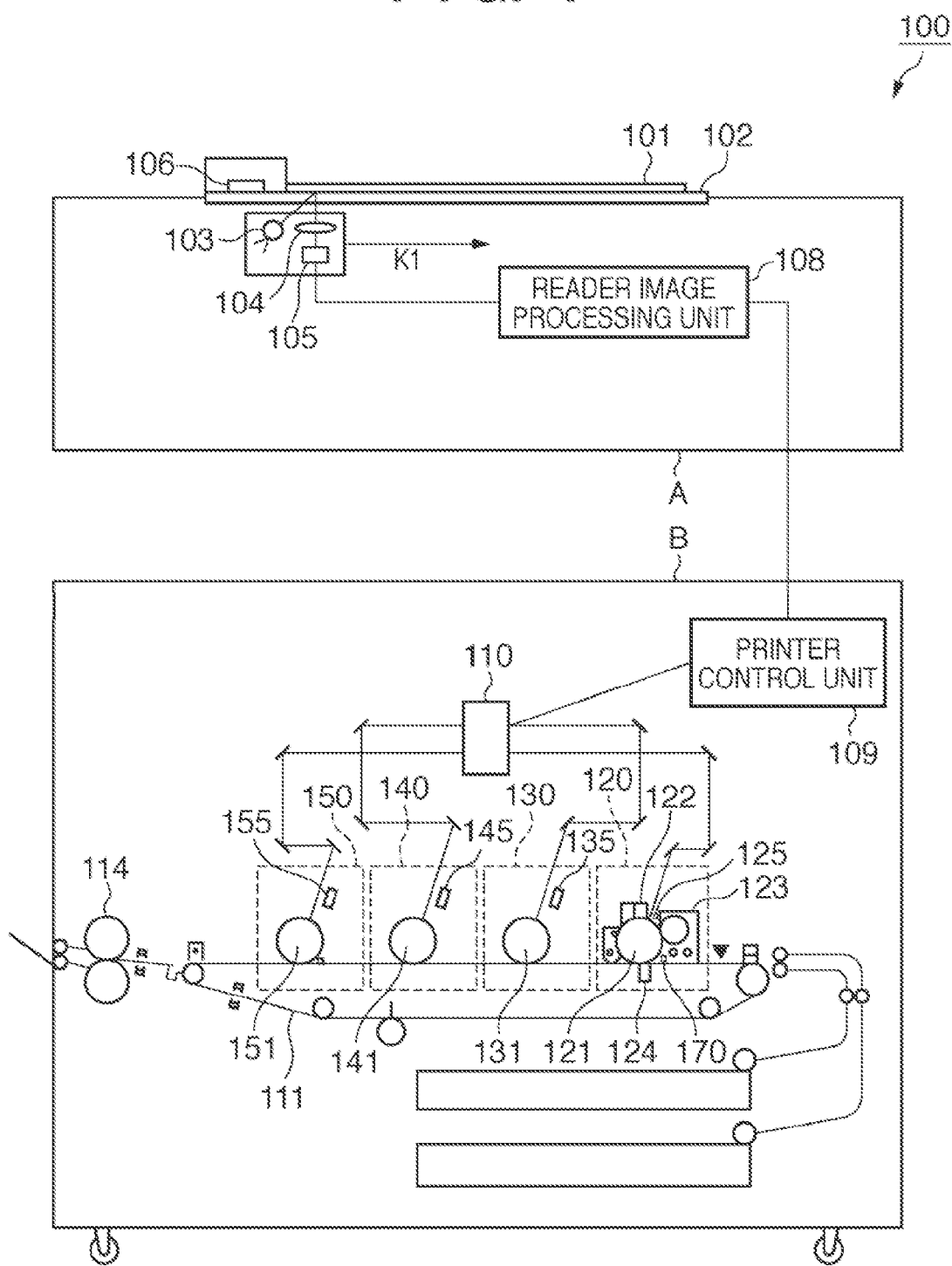
FIG. 1 is a view exemplifying the arrangement of a color copying machine.

A copying machine 100 shown in FIG. 1 includes a reader unit A which reads an image from a document, and a printer unit B which forms the image obtained by reader unit A on a printing medium. The reader unit A is an example of an image reading unit which reads a pattern image formed on a printing medium by an image forming unit and creates image data containing a luminance value. Before reading a document 101 set on an original platen glass 102, the reader unit A reads a reference white plate 106 and performs so-called shading correction. The document 101 is irradiated with light from a light source 103, and the reflected light forms an image on a CCD (Charge-Coupled Device) sensor 105 via an optical system 104. A reading unit including the CCD sensor 105 moves in a direction indicated by an arrow K1 to convert the document into an electrical signal data string for each line. Note that not the reading unit but the document may move. A reader image processing unit 108 converts the electrical signal data string into an image signal.

Figure 2:
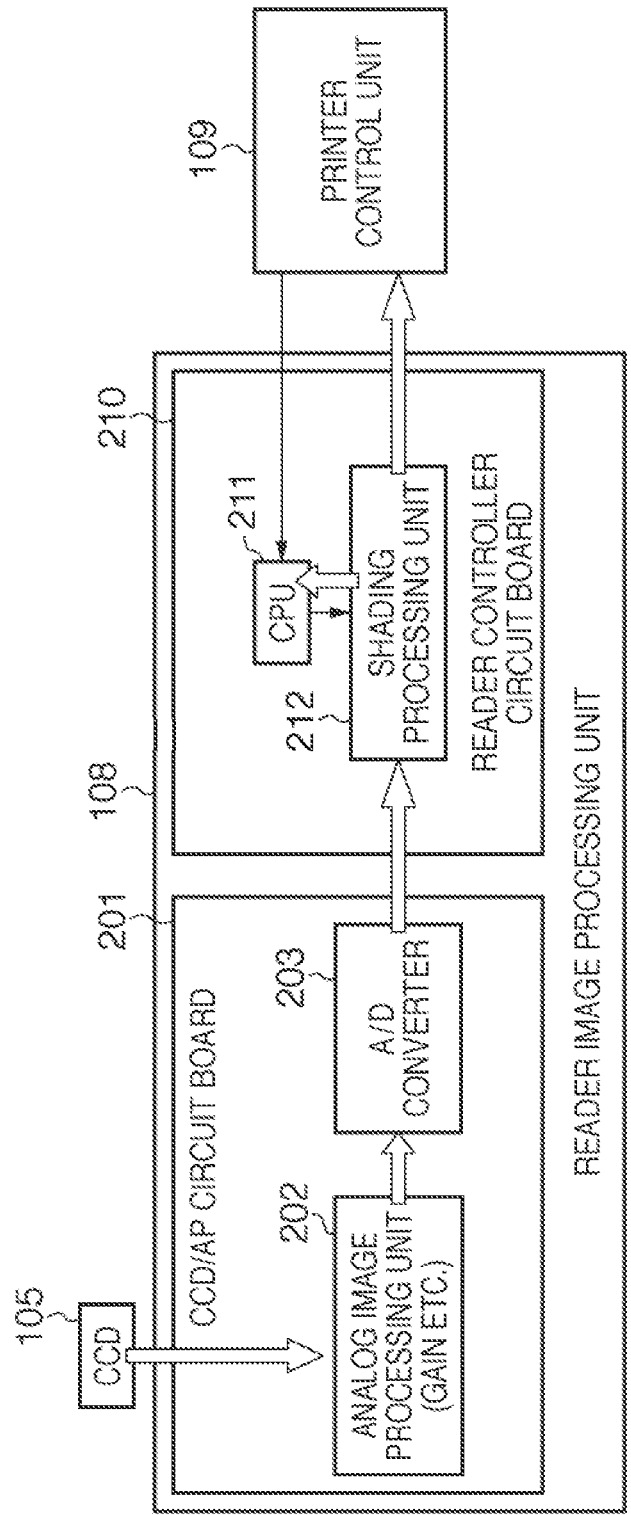
FIG. 2 is a block diagram showing a reader image processing unit.

An analog image processing unit 202 on a CCD/AP (Analog Processing) circuit board 201 adjusts the gain and the like for an image signal obtained by the CCD sensor 105 shown in FIG. 2. An A/D converter 203 then converts the image signal into a digital image signal, and outputs it to a controller circuit board 210 of the reader unit A. A shading processing unit 212 on the controller circuit board 210 of the reader unit A performs shading correction for the image signal under the control of a CPU 211, and outputs the resultant image signal to a printer control unit 109 of the printer unit B. At this time, the image signal contains R, G, and B luminance values.

The printer unit B will be described next. Referring to FIG. 1, the printer control unit 109 converts the image signal into a laser beam having undergone PWM (Pulse Width Modulation). The laser beam is deflected and scanned by a polygon scanner 110 to expose photosensitive drums 121, 131, 141, and 151 of image forming units 120, 130, 140, and 150. As a result, electrostatic latent images are formed. The image forming units 120, 130, 140, and 150 correspond to yellow (Y), magenta (M), cyan (C), and black (Bk), respectively. The image forming units 120, 130, 140, and 150 have almost the same arrangement, and only the image forming unit 120 for yellow will be explained. These image forming units are an example of image forming units which form predetermined pattern images on a printing medium in accordance with preset contrast potentials. A primary charger 122 charges the surface of the photosensitive drum 121 to a predetermined potential. A developing unit 123 develops the electrostatic latent image on the photosensitive drum 121 to form a toner image. A transfer blade 124 discharges the photosensitive drum 121 from the back surface of a transfer belt 111 to transfer the toner image on the photosensitive drum 121 to a printing medium on the transfer belt 111. Then, a fixing unit 114 fixes the toner image onto the printing medium.

Note that the photosensitive drums 121, 131, 141, and 151 have surface electrometers 125, 135, 145, and 155, respectively, to measure their surface potentials. The surface electrometers 125, 135, 145, and 155 are used to adjust the contrast potential.

Figure 3:
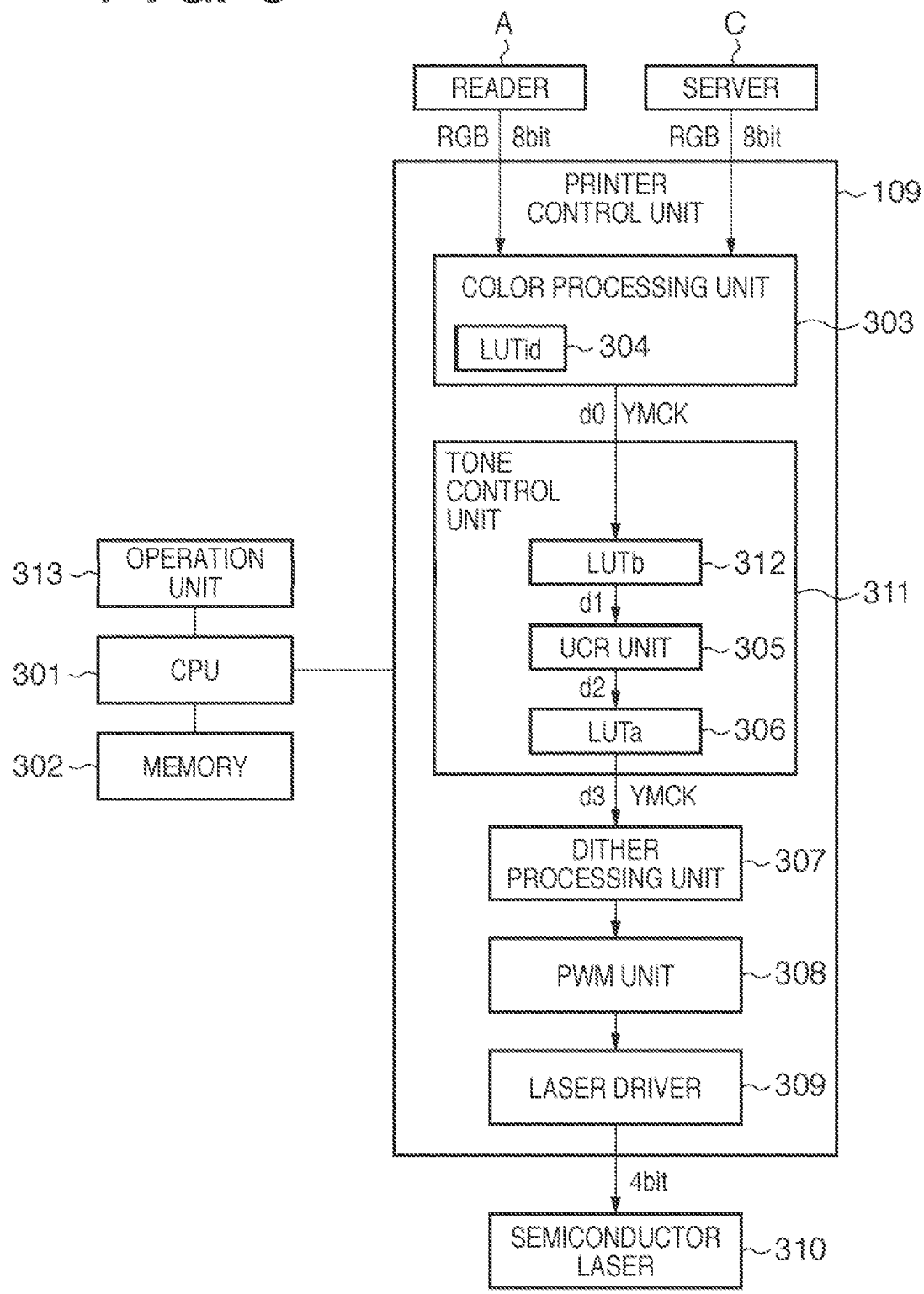
FIG. 3 is a block diagram showing a printer control unit 109.

A CPU 301 comprehensively controls the units of the printer control unit 109 shown in FIG. 3. The control unit may be formed not from the CPU 301 but from hardware such as an ASIC (Application Specific Integrated Circuit). A memory 302 includes a ROM and RAM, and stores control programs and various data. An image signal processed by the reader unit A, a print server C, or the like is input to a color processing unit 303 of the printer control unit 109. Of the image signal, a luminance value obtained from a pattern image formed on a printing medium X will be defined as i(X), and one obtained from a pattern image formed on a printing medium Z will be defined as i(Z).

The color processing unit 303 converts a luminance value contained in image data into a density value using a luminance-density conversion table LUTid. The LUT stands for a lookup table. The LUT need not always take the table form, and may be implemented by a function or program code. The color processing unit 303 applies image processing and color processing to an input image signal to obtain a desired output when the printer unit B has an ideal output characteristic. The number of tones of the input signal is given by eight bits. For higher accuracy, the color processing unit 303 expands 8 bits to 10 bits. Each of Y, M, C, and K density values output from the color processing unit 303 will be defined as d0. After that, the image signal is sent to a dither processing unit 307 via a tone control unit 311. The dither processing unit 307 performs dither processing for the image signal to convert it into a 4-bit signal.

An LUTid 304 is prepared for a specific type of printing medium (first printing medium) at the beginning. However, in the embodiment, an LUTid 304 for an arbitrary type of second printing medium is added by performing an operation of adding an arbitrary type of printing medium (second printing medium). The CPU 301 switches the LUTid 304 for each printing medium to be used.

The tone control unit 311 includes an LUTb 312, UCR unit 305, and LUTa 306, and corrects an image signal to adjust the printer unit B to ideal characteristics. The LUTa 306 and LUTb 312 are 10-bit conversion tables for correcting the density characteristic, and are particularly used to change the γ characteristic of the printer unit B. The tone control unit 311 converts a density value output from the LUTid 304 using the LUTb 312.

The LUTa 306 is created for the first printing medium X to optimize the characteristics of the printer unit B. Note that the first printing medium X is a printing medium designed in advance by the manufacturer of the image formation apparatus to obtain a desired tone characteristic. The LUTa 306 of the present invention is commonly used for other printing media as well. As the LUTa 306, the latest table is always used because it is a table used to correct variations of the engine characteristics of the printer unit B depending on the installation environment or a change over time. The LUTa 306 may be created using any type of printing medium. The tone control unit 311 converts a density value of each color into an output density of the color using the LUTa 306.

The LUTb 312 is used to appropriately adjust the tone characteristic for each printing medium. The LUTb 312 is prepared for each printing medium and switched in accordance with a printing medium designated by the operator.

The UCR unit 305 is a circuit which limits the sum of image signal levels by restricting the integrated value of image signals in each pixel. If the sum exceeds a predetermine value, the UCR unit 305 performs undercolor removal processing (UCR) to replace a predetermined amount of C, M, and Y signals with a K signal, thereby decreasing the sum of image signal levels.

Assume that the upper limit value is 280%. Then, if a signal for Y=100%, M=100%, C=100%, and K=0% is input, the integrated value becomes 300%, exceeding the predetermined value. No color changes if K replaces a portion where Y, M, and C are formed by equal amounts. Thus, the UCR unit 305 decreases Y, M, and C by 10% each, and increases K by 10% instead. This results in Y=90%, M=90%, C=90%, and K=10%, and the integrated value can be maintained at 280% without changing the color. The purpose of restricting the sum of image signal levels is to restrict the amount of applied toner in image formation by the printer unit B. Optimization of the operation of the printer unit B in the embodiment is meant to prevent image quality degradation or the like caused by the amount of applied toner exceeding the predetermined amount. In the embodiment, the tone characteristic is adjusted using the LUTb 312 arranged on the preceding stage of the UCR unit 305. Hence, even if the tone characteristic is optimized for the second printing medium, the amount of applied toner does not exceed the predetermined amount.

The LUTb 312 controls a tone characteristic corresponding to the input density value d0, and outputs a density value d1. The UCR unit 305 controls a tone characteristic corresponding to the input density value d1, and outputs a density value d2. The LUTa 306 controls a tone characteristic corresponding to the input density value d2, and outputs a density value d3. In a calibration step and printing medium adding step to be described later, the density value d0 is sometimes directly output as the density value d3 because the LUTa 306, LUTb 312, and the like are controlled so as not to operate.

The signal output from the tone control unit 311 undergoes dither processing by the dither processing unit 307 and pulse width modulation by a PWM unit 308. A laser driver 309 causes a semiconductor laser to emit light using the PWM-modulated signal. To do this, the dither processing unit 307 performs halftone processing to convert a 10-bit image signal into 4-bit data.

<Control of Image Forming Conditions>

Calibration using the first printing medium X set in advance will be explained first. The printing medium X is, for example, a printing medium designated by the manufacturer of the image formation apparatus upon shipment from the factory or a printing medium designated at the time of maintenance by the maintenance engineer. In this embodiment, there are the first calibration function of adjusting the contrast potential, and the second calibration function of adjusting the γ correction circuit (LUTa 306 and LUTb 312) of the tone control unit 311 for image data.

I. First Calibration

In step S401 in FIG. 4A, the CPU 301 outputs the first test print, and measures the surface potential of the photosensitive drum. For example, the CPU 301 creates image data (YMCK density value d0 (=d1)) of the first test pattern and outputs it to the tone control unit 311, forming the first test pattern as an image on the first printing medium X. The image data may be not created by the CPU 301 but stored in the ROM of the memory 302 in advance. The CPU 301 controls the tone control unit 311 so that the LUTb 312 does not act on the image data, in order to determine whether the LUTa 306 acts on an image formed on a printing medium. The printing medium X bearing the first test pattern image serves as the first test print. As the contrast potential to be used to output the first test print, an initial value predicted to achieve the target density in the atmosphere environment (for example, absolute moisture content) at that time is set. The memory 302 is assumed to store contrast potential values corresponding to various atmosphere environments. The CPU 301 measures an absolute moisture content and determines a contrast potential corresponding to the measured absolute moisture content.

Figure 5A:
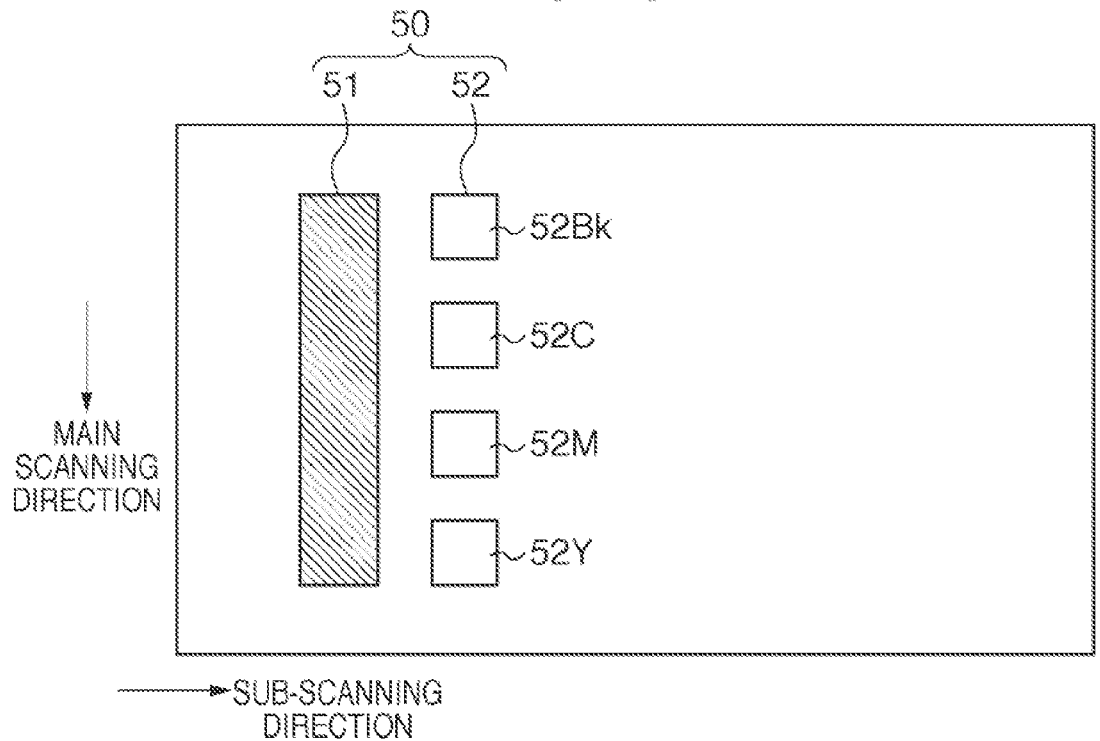
FIGS. 5A and 5B show view exemplifying the first test pattern used in the first calibration and view exemplifying the first test pattern used in the second calibration, respectively.

As shown in FIG. 5A, a first test pattern 50 is an example of the first pattern image including, for example, a stripe pattern 51 and patch pattern 52. The stripe pattern 51 is a strip-like pattern including halftone densities of Y, M, C, and Bk. The patch pattern 52 includes patch patterns 52Y, 52M, 52C, and 52Bk formed from maximum density patches (for example, 255-level density signals) for Y, M, C, and Bk. The surface electrometers 125, 135, 145, and 155 measure actual contrast potentials upon forming maximum density patches.

In step S402, the reader unit A reads the output first test print, and transfers the R, G, and B values to the CPU 301 of the printer control unit 109. The CPU 301 converts the R, G, and B values into optical densities using an LUTid(X) prepared in advance for the first printing medium X.

In step S403, the CPU 301 calculates a contrast potential b corresponding to the target maximum density. Referring to FIG. 6, the abscissa indicates the development bias potential, and the ordinate indicates the image density. The contrast potential is the difference between the development bias potential and the surface potential of the photosensitive drum when a semiconductor laser 310 of each color emits light at the maximum level after the primary charge of the photosensitive drum. Assume that the maximum density obtained from the first test print formed using a contrast potential a is Da. In this case, the image density is linear with respect to the contrast potential near the maximum density (density of 0.8 to 2.0), as indicated by a solid line L. The solid line L is determined by the contrast potential a and maximum density Da. In the embodiment, for example, the target maximum density is set to 1.6. The CPU 301 calculates a contrast potential b corresponding to the target maximum density based on the solid line L. The memory 302 is assumed to store in advance a table or function corresponding to the solid line L. The contrast potential b is calculated using, for example, equation (1):

$$b = (a + ka) \times 1.6 / Da \tag{1}$$

where ka is a correction coefficient determined by the type of developing method.

In step S404, the CPU 301 determines and sets a grid potential Vg and development bias potential Vds based on the contrast potential b.

Figure 7:
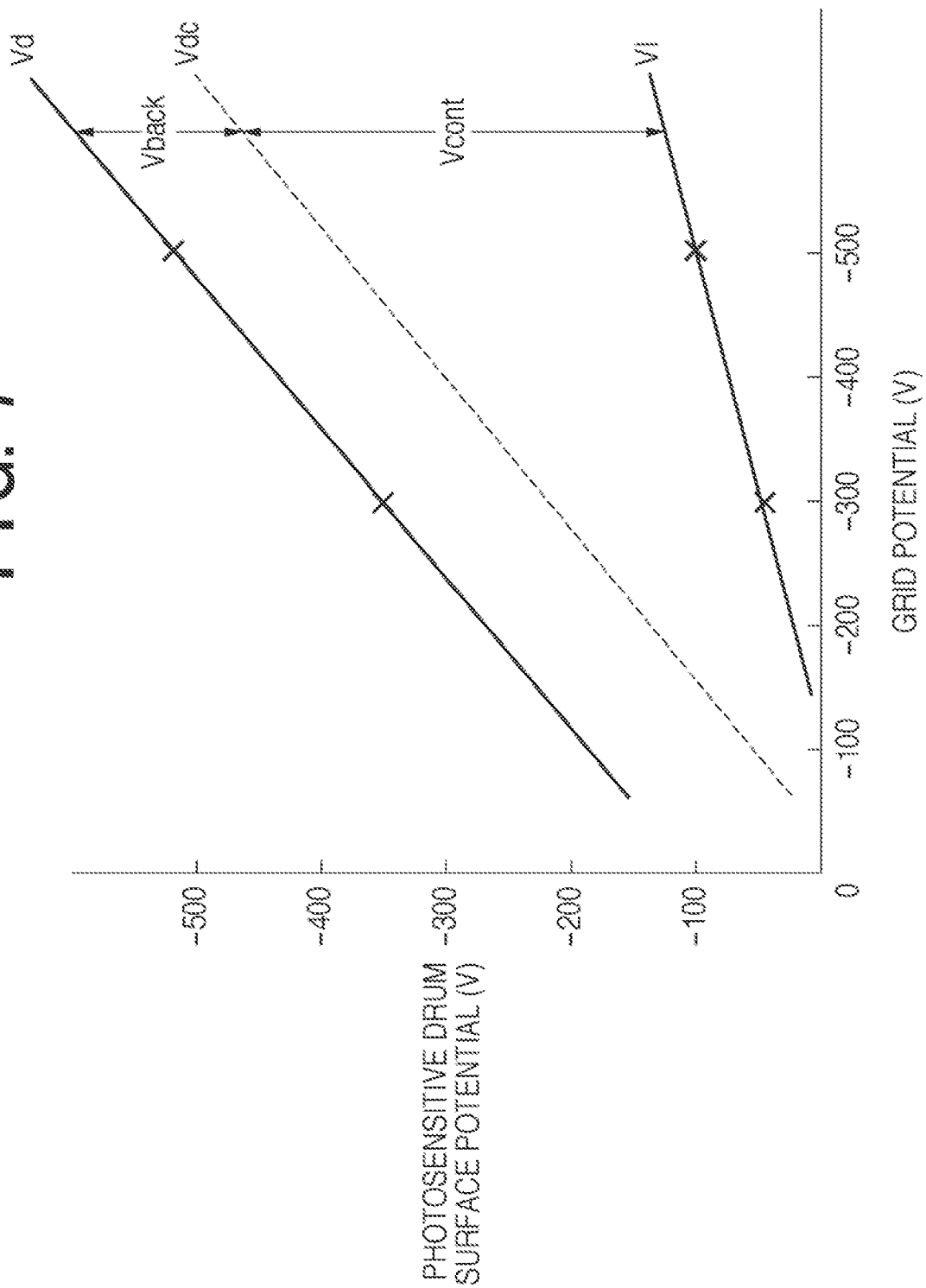
FIG. 7 is a graph showing the relationship between the grid potential Vg and the photosensitive drum surface potential.

Referring to FIG. 7, the CPU 301 sets the grid potential Vg to −300 V, performs scanning while minimizing the emission pulse level of the semiconductor laser 310 of each color, and causes each of the surface electrometers 125, 135, 145, and 155 to measure a surface potential Vd. In addition, the CPU 301 sets the grid potential Vg to −300 V, and causes each of the surface electrometers 125, 135, 145, and 155 to measure a surface potential Vl at the maximum emission pulse level of the semiconductor laser 310 for each color. Similarly, the CPU 301 sets the grid potential Vg to −700 V, and measures the surface potentials Vd and Vl. The CPU 301 can determine the relationship between the grid potential and the photosensitive drum surface potential shown in FIG. 7 by interpolating or extrapolating data at the −300 V and data at −700 V. Control to obtain potential data is called potential measurement control.

A contrast potential Vcont is determined as the difference voltage between a development bias Vdc and the surface potential Vl. A higher maximum density can be ensured for a higher contrast potential Vcont. The CPU 301 determines a grid potential Vg corresponding to the determined contrast potential b based on the relationship shown in FIG. 7. The CPU 301 determines a corresponding surface potential Vd based on the determined grid potential Vg and the relationship shown in FIG. 7. The CPU 301 also determines the development bias Vdc by subtracting Vback (for example, 150 V) from the surface potential Vd. The potential Vback is determined to prevent adhesion of fog toner to an image.

II. Second Calibration

As is well known, an image formation apparatus such as a copying machine forms a copy (output image) by reading a document image. That is, the density (tone characteristic) of a document image and the density (tone characteristic) of an output image need to match each other. In processes performed by the copying machine, the document image is converted into a luminance signal by the reader unit, and the luminance signal is converted into a corresponding density signal. The density signal is further converted into a laser output signal corresponding to the amount of applied toner. A laser beam corresponding to the laser output signal irradiates the image carrier, forming an electrostatic latent image. The electrostatic latent image is developed with toner, forming a toner image. The toner image is transferred to a printing medium, and fixed by the fixing unit, thereby forming an output image.

Figure 8:
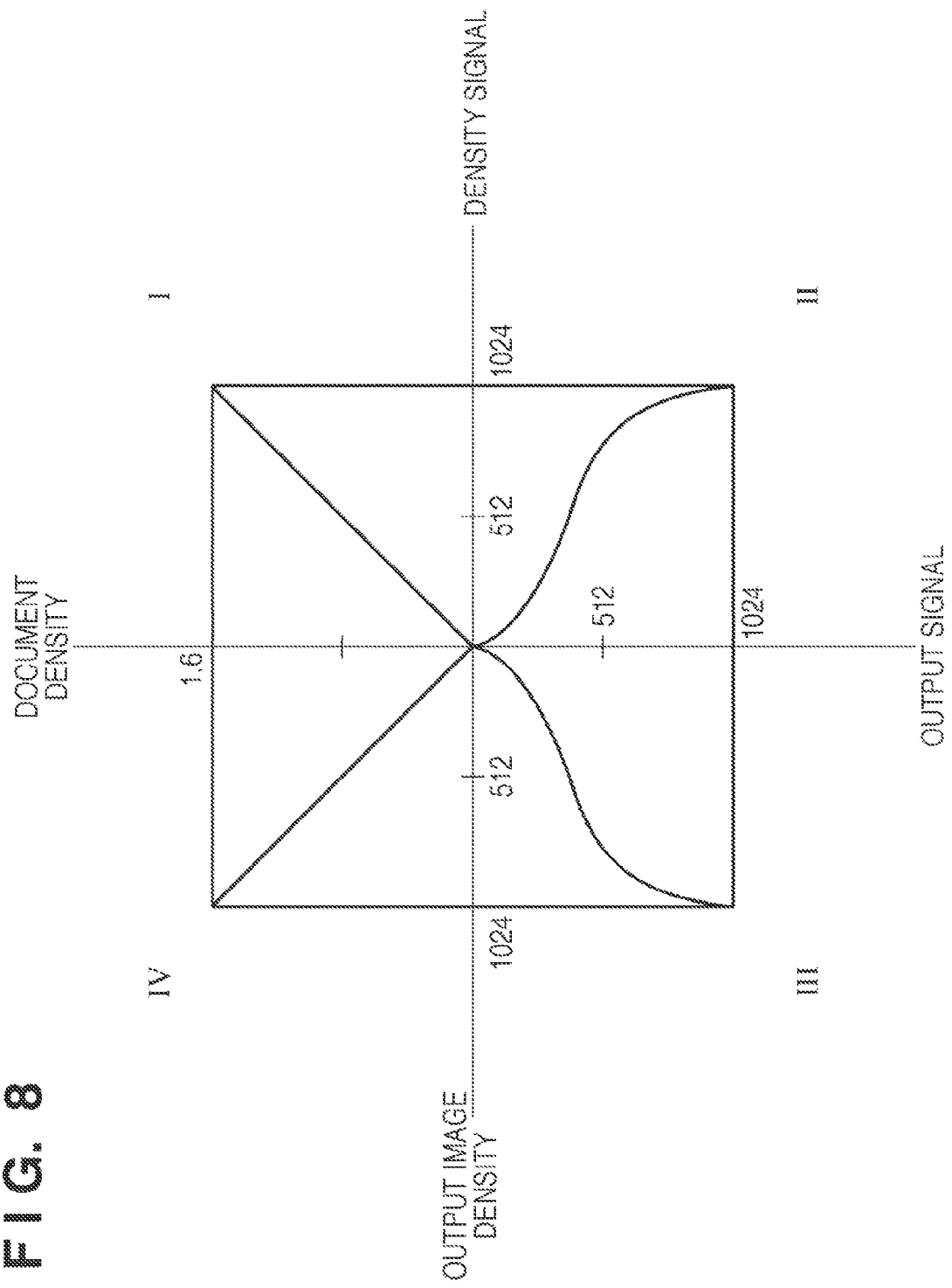
FIG. 8 is a characteristic conversion chart showing characteristics necessary to reproduce the density of a document image.

FIG. 8 shows the relationship between signals in a series of copy processes until an output image is formed from a document. The region I represents the characteristic of the reader unit A which converts a document density into a density signal. Note that the document density is expressed as an optical density obtained by reading a document using an optical densitometer. The number of tones of the density signal is 1,024. The region II represents the characteristic of the tone control unit 311 (LUTa 306 and LUTb 312) for converting a density signal into a laser output signal. The number of tones of the laser output signal is also 1,024. An LUTa and LUTb(X) for the first printing medium X are set here. The LUTb(X) has a linear characteristic for the first printing medium X, so only the LUTa substantially acts in the tone control unit 311. The LUTb(X) is merely a table which returns an input value directly as an output value, and may be omitted. The region III represents the characteristic of the printer unit B which converts a laser output signal into an output density. The output image density is sometimes called a printing density. The number of tones of the output image density is 1,024. The region IV represents the relationship between the document density and the printing density. This relationship represents the whole tone characteristic of the copying machine 100 according to the embodiment.

In the copying machine 100, to obtain a linear tone characteristic in the region IV, the tone control unit 311 in the region II corrects the distortion of the printing characteristic of the printer unit B in the region III. The LUTa can be easily created by only replacing the input with the output in the characteristic in the region III obtained upon outputting a test print without operating the tone control unit 311. The pattern image on the test print includes a plurality of patches of different tones. The amount of applied toner (output signal) used to form each patch is already known, as a matter of course. On the other hand, the density of each patch is read as a luminance value by the reader unit A and converted into a density signal based on the LUTid. From them, the relationship between different amounts of applied toner (output signals) given as inputs and density signals (density values) serving as corresponding outputs is obtained. Hence, reversing the relationship between the input and the output provides an amount of applied toner (output signal) which should be output in correspondence with a density signal given as an input. The LUTa indicates the relationship between the density signal and the output signal. In the embodiment, the number of tones of the output is 256 (8 bits), but that of tones in the tone control unit 311 is 1,024 because the tone control unit 311 processes a 10-bit digital signal.

Referring to FIG. 4B, the CPU 301 performs the second calibration. The second calibration is generally performed after the end of the first calibration.

In step S411, the CPU 301 outputs the second test print. For example, the CPU 301 creates image data (YMCK density value d0 (=d1)) of the second test pattern and outputs it to the tone control unit 311, forming the second test pattern as an image on the first printing medium X. The image data may be not created by the CPU 301 but stored in the ROM of the memory 302 in advance. The printing medium X bearing the second test pattern image serves as the second test print. At this time, the CPU 301 performs image formation without operating the LUTa and LUTb of the tone control unit 311. The density signals Y, M, C, and K output from the UCR unit 305 are input to the dither processing unit 307 while detouring around the LUTa 306.

Figure 5B:
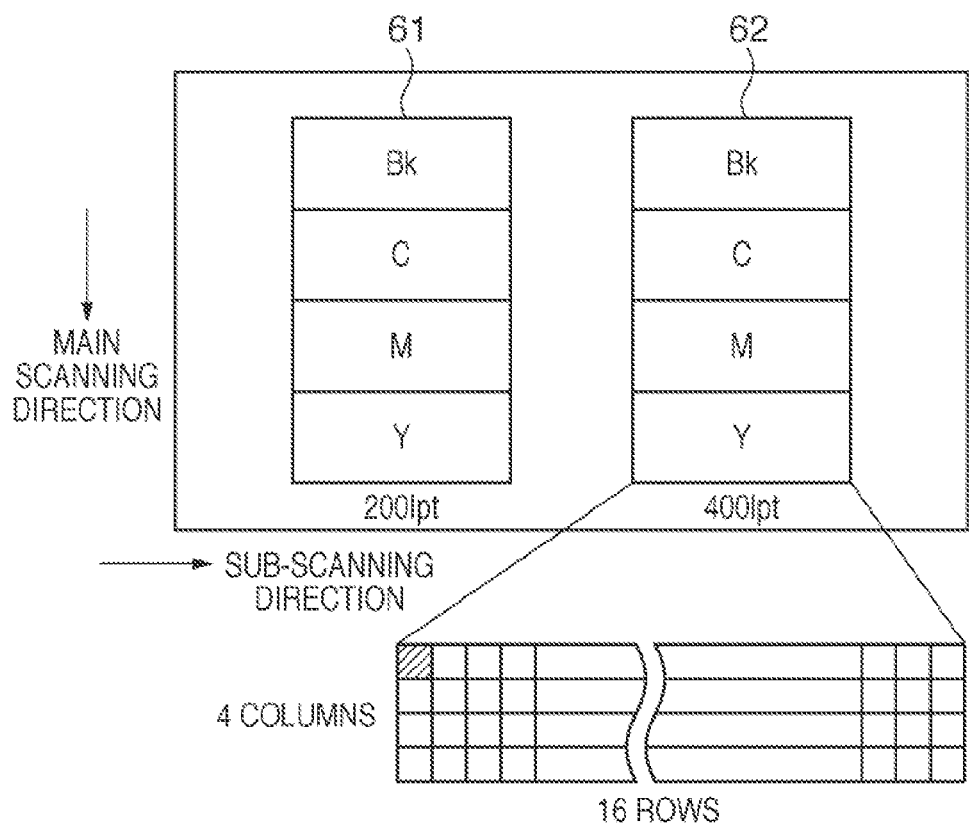

In the second test print, for example, the second test pattern (patch groups 61 and 62) having 4 columns×16 rows (that is, 64 tones) in gradation for each of Y, M, C, and Bk is formed, as shown in FIG. 5B. The second test pattern is an example of the second pattern image. For example, low-density regions out of a total of 256 tones are preferentially assigned to the 64-tone test pattern. This allows the tone characteristic at a highlight portion to be finely adjusted. Note that a second test pattern for low resolution (160 to 180 lpi) and that for high resolution (250 to 300 lpi) may be prepared separately. In FIG. 5B, the former is the patch group 61, and the latter is the patch group 62. Note that lpi stands for lines/inch. To form an image of each resolution, the dither processing unit 307 performs dither processing having parameters corresponding to the resolution. Note that it suffices to create a halftone image at a resolution of about 160 to 180 lpi and a line image such as a character at a resolution of about 250 to 300 lpi. Test patterns of the same tone level are output at the two resolutions. If the tone characteristic largely changes due to the difference in resolution, the tone level may be set in accordance with the resolution. If the printer unit B has a capability of forming an image at three or more resolutions, the test print for the second calibration may be divided into a plurality of pages.

In step S412, the reader unit A reads an image from the second test pattern. R, G, and B luminance values output from the second test pattern are input to the color processing unit 303. The color processing unit 303 converts the R, G, and B luminance values into density values using the LUTid(X). The LUTid(X) is used because the printing medium X is used.

In step S413, the CPU 301 associates each density value with a laser output level used to create the second test pattern and a test pattern (tone patch) creation position, thereby creating a table indicating the relationship between the laser output level and the density. The CPU 301 writes the created table in the memory 302. At this time, the CPU 301 can determine the characteristics of the printer unit B in the region III shown in FIG. 8. By replacing the input with the output in the characteristic, the LUTa of the printer unit B is determined and set in the tone control unit 311. In some cases, data is missing to determine the LUTa by calculation. This is because tone patches of only 64 tones are formed though those of 256 tones are originally required. The CPU 301 creates necessary data by interpolating missing data. The second calibration can implement a linear tone characteristic with respect to the target density. When determining the LUTb(X), the LUTb(X) is set in the tone control unit 311 to effectively function the LUTa, and then steps S411 to S413 are performed. That is, the LUTb(X) can be determined by the same method as that for the LUTa.

The first calibration and second calibration are performed sequentially in the embodiment, but only either one may be performed individually. In the embodiment, calibration can be performed to effectively correct variations of the image density, image reproducibility, or tone reproducibility that may occur in the short or long term. The image quality can therefore be maintained.

<Operation of Adding Arbitrary Type of Printing Medium (Second Printing Medium)>

Next, processing of adding the second printing medium so that the first calibration and second calibration can be performed using the second printing medium different from the first printing medium will be described. A feature of the embodiment is to optimize the printer characteristics by performing calibration using the second printing medium instead of the first printing medium.

Using the second printing medium for calibration which assumes the use of the first printing medium causes a problem in the corrected printer output characteristic. For the first printing medium, the amount of applied toner is known, and calibration is designed not to generate defects in an image. By performing calibration using the first printing medium, the tone characteristic can be adjusted to a desired characteristic. However, for the second printing medium, the relationship between the density and the amount of applied toner is unknown. If another printing medium is used in calibration which assumes the use of the first printing medium, the amount of applied toner may exceed an amount assumed in the design. In this case, problems may arise in transfer or fixing, resulting in image quality degradation.

Figure 9:
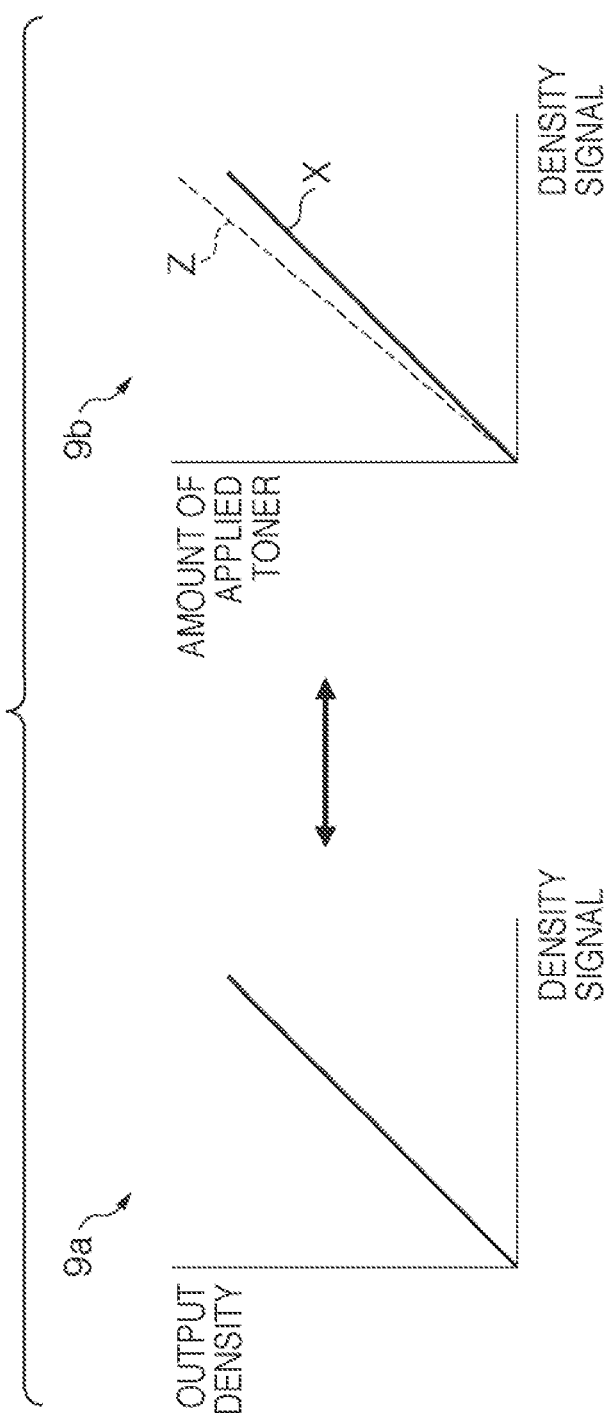
FIG. 9 shows graphs 9a and 9b for explaining the characteristic difference between printing media.

Graphs 9a and 9b of FIG. 9 exemplify another type of printing medium Z whose output density lowers at the same amount of applied toner as that of the first printing medium X. Assume that the image forming conditions are set so that both the first printing medium X and another type of printing medium Z exhibit an output density characteristic shown in graph 9a of FIG. 9 for a certain primary color. Graph 9b in FIG. 9 shows the amount of applied toner on each printing medium with respect to the density signal. That is, the amount of applied toner on another type of printing medium Z is larger than that on the first printing medium X. When a secondary color, tertiary color, and the like are output in this state, toner in an amount more than assumed exists on the printing medium Z, generating a fixing error.

In the embodiment, the sum of signal levels of image signals is restricted immediately before the LUTa to relax the excess amount of applied toner. To implement this, identical pattern images (image patterns) are formed on the first printing medium X and second printing medium Z using the same image signal. The same image signal is used to equalize the amounts of applied toner on the first printing medium X and second printing medium Z. The reader unit A reads an image from the second printing medium Z, and determines the luminance value i(Z). The CPU 301 holds data of the amount of applied toner (output density value d(x)) for each tone patch used to form an image pattern on the printing medium Z. As described above, the LUTid is a table for converting a luminance value into a density value, so the correspondence between the luminance value i(Z) and the output density value d(x) directly serves as the LUTid(Z). The CPU 301 can therefore create the LUTid(Z) as long as the luminance value i(Z) and output density value d(x) have been obtained. When performing calibration using the second printing medium Z, the LUTid(Z) can be set in the color processing unit to create an LUTa which implements the same tone characteristic as that obtained by calibration using the first printing medium.

Figure 10:
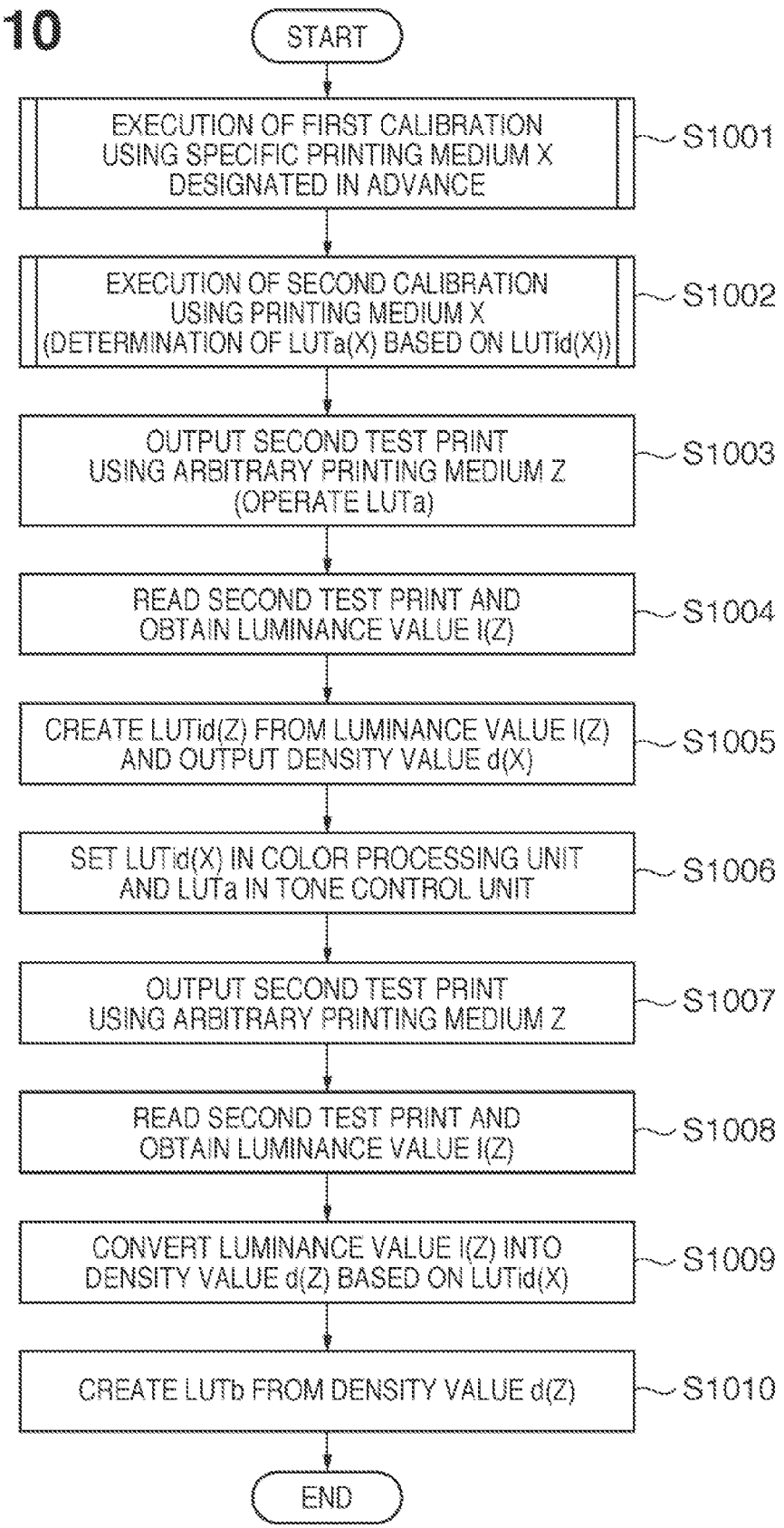
FIG. 10 is a flowchart showing a printing medium adding operation.

FIG. 10 is a flowchart showing a printing medium adding operation. When the user designates addition and registration of a printing medium for calibration by pressing a button of an operation unit 313 on the copying machine 100, the CPU 301 activates the adding operation. At this point of time, the LUTid(X) has been set in the color processing unit 303. The LUTb(X) does not act on an image signal because it has a property of directly outputting an input, like a unit matrix.

In step S1001, the CPU 301 performs the aforementioned first calibration (steps S401 to S404) using the first printing medium X designated in advance. In step S1002, the CPU 301 performs the second calibration (steps S411 to S413) using the first printing medium X. That is, the first calibration and second calibration are performed sequentially. An LUTa is thus created. The LUTa is set in the tone control unit 311, and the tone characteristic of the image forming unit is adjusted to a desired characteristic using the specific printing medium X. In this state, the CPU 301 quickly activates the second calibration using an arbitrary printing medium Z.

In step S1003, the CPU 301 outputs the second test print using the second printing medium Z to be added. For example, the CPU 301 creates image data of the second test pattern and outputs it to the tone control unit 311. The tone control unit 311 controls the UCR unit 305 and LUTa 306 to act on the density value of the image data of the second test pattern, determining the output density value d(X). The output density value d(X) corresponds to the amount t(X) of applied toner. In accordance with this amount of applied toner, the printer unit B forms the second test pattern as an image on the printing medium Z. This serves as the second test print. At this time, the CPU 301 controls the printer unit B to perform image formation by operating the LUTa 306 of the tone control unit 311 without operating the LUTb. The LUTa 306 has been created in step S1002. The density signals Y, M, C, and K output from the UCR unit 305 are processed based on the LUTa 306 and then input to the dither processing unit 307. Note that the second test pattern itself is identical between the printing media X and Z. The output density value d(Z) for the printing medium Z is thus equal to the output density value d(X) for the printing medium X. The CPU 301 stores, in the memory 302, the amount of applied toner (output density value d(X)) used to create the second test pattern. The output density value d(X) is stored in correspondence with the formation position or tone data of each tone patch.

In step S1004, the CPU 301 controls the reader unit A to read the image pattern formed on the printing medium Z and obtain the luminance value i(Z). In step S1005, the CPU 301 creates an LUTid(Z) from the read luminance value i(Z) and the output density value d(X) stored in the memory 302. Further, the CPU 301 stores the LUTid(Z) in the memory 302 in association with identification information of the printing medium Z. When the printing medium Z is designated via the operation unit 313, the CPU 301 reads out the corresponding LUTid(Z) from the memory 302, and sets it in the color processing unit 303.

In step S1006, the CPU 301 sets the LUTid(X) in the color processing unit 303 and the LUTa in the tone control unit 311. In step S1007, the CPU 301 outputs the second test print using the printing medium Z. Note that the CPU 301 sets to detour around the LUTb in the tone control unit 311. The CPU 301 stores, in advance in the memory 302, the density value d0 input to the tone control unit 311 for the second test print.

In step S1008, the CPU 301 controls the reader unit A to read the image pattern formed on the printing medium Z, obtaining the luminance value i(Z).

In step S1009, the CPU 301 controls the color processing unit 303 to convert the luminance value i(Z) into a density value d(Z) using the LUTid(X).

In step S1010, the CPU 301 reverses the correspondence between the density value d0 serving as an input and the density value d(Z) serving as an output, thereby creating an LUTb(Z) for converting the density value d(Z) into the density value d0. The CPU 301 stores the LUTb(Z) in the memory 302 in association with identification information of the printing medium Z. When the printing medium Z is designated via the operation unit 313, the CPU 301 reads out the corresponding LUTb(Z) from the memory 302, and sets it in the tone control unit 311.

Figure 11:
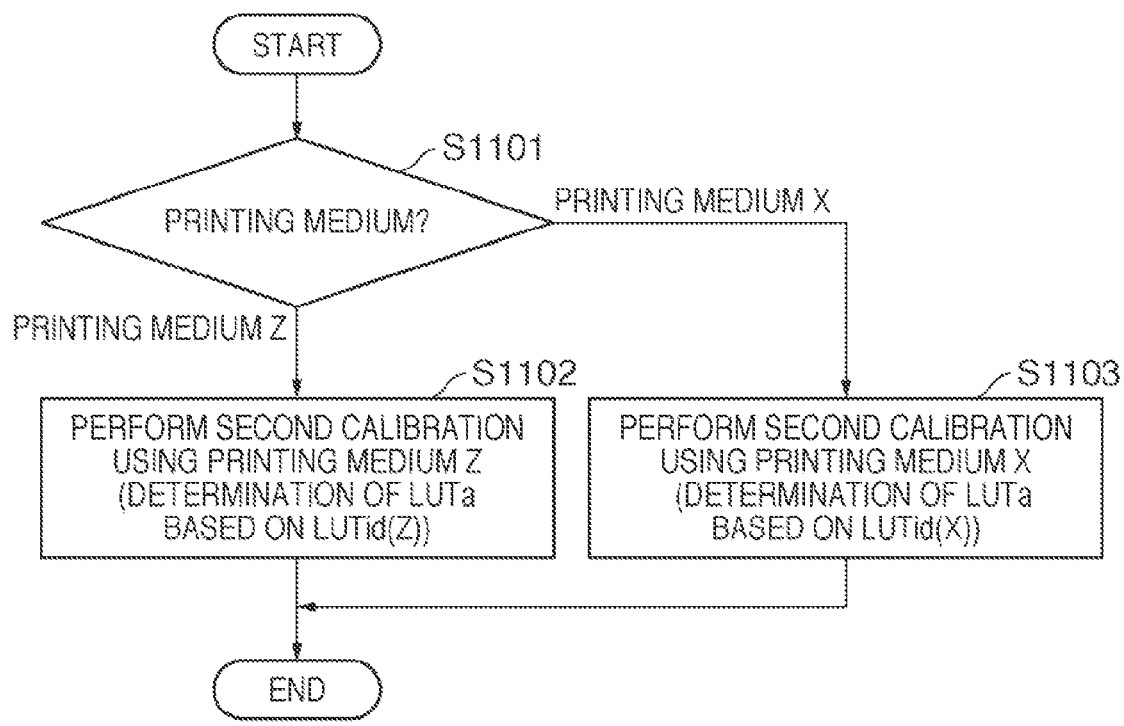
FIG. 11 is a flowchart showing the second calibration using a specific or added printing medium.

Thereafter, calibration is activated when the environment changes, a predetermined number of images or more are formed, or the operator designates execution of calibration via the operation unit. It is generally estimated that the tone characteristic in the image forming unit has varied when such an event occurs. The CPU 301 activates the second calibration at the timing when it is estimated that the tone characteristic in the image forming unit has varied. Processing for the above case will be explained with reference to FIG. 11.

In step S1101, the CPU 301 accepts, via the operation unit 313, designation of a type of printing medium to be used for the second calibration, and determines the designated type of printing medium. If the printing medium Z is designated, the process advances to step S1102. In step S1102, the CPU 301 reads out, from the memory 302, the LUTid(Z) corresponding to the designated printing medium Z, and sets it in the color processing unit 303. Further, the CPU 301 reads out, from the memory 302, the LUTb(Z) corresponding to the printing medium Z, and sets it in the tone control unit 311. The CPU 301 then performs the first calibration (steps S401 to S404) and the second calibration (steps S411 to S413). Particularly, the second calibration updates the LUTa.

If the printing medium X is designated, the process advances to step S1103. In step S1103, the CPU 301 sets the LUTid(X) corresponding to the designated printing medium X in the color processing unit 303. In addition, the CPU 301 reads out, from the memory 302, the LUTb(X) corresponding to the printing medium X, and sets it in the tone control unit 311. The CPU 301 then performs the first calibration (steps S401 to S404) and the second calibration (steps S411 to S413). Particularly, the second calibration updates the LUTa.

Note that the CPU 301 creates the LUTa 306, but does not create the LUTb 312. This is because the LUTa 306 is used to restore an original characteristic which varies depending on the installation environment or use condition, whereas the LUTb 312 is independent of the installation environment and use condition. That is, the LUTb 312 is a table which changes depending on the type of printing medium. Basically, the LUTb 312 which has been added and registered by addition/registration processing is kept used.

According to the embodiment, the LUTb(Z) and LUTid(Z) can be easily created by performing calibration using the second printing medium Z immediately after performing calibration using the first printing medium X to adjust the image forming unit to a desired state. The influence of the image forming unit-dependent tone characteristic on the LUTid and LUTb can be ignored as long as calibration has been performed using the first printing medium X. Calibration provides only a tone characteristic dependent on the second printing medium Z. For this reason, the creation accuracy of the LUTid(Z) and LUTb(Z) is increased by creating the LUTid(Z) and LUTb(Z) immediately after performing calibration using the first printing medium X.

According to the embodiment, the output characteristic of the printer unit B for a single color can be adjusted to a desired characteristic at high precision. The embodiment can improve color reproducibility when the printer control unit 109, an external controller, or the like performs color management using an ICC profile. Note that ICC stands for International Color Consortium.

By performing the above-described addition processing, a plurality of arbitrary types of printing media Z1 to Zn (n is the number of arbitrary types of printing media registered for calibration) can be registered in the printer control unit 109. For example, to further add another arbitrary type of printing medium Z2 using a printing medium Z1 which has already been added, it suffices to perform the sequence described with reference to FIG. 10 by replacing the printing medium X with the printing medium Z1 and the printing medium Z with the printing medium Z2. Similarly, Z3 to Zn can be added. Note that the created LUTid(Zi) and LUTb(Zi) are stored in the memory 302 in association with identification information i indicating the type of printing medium. The CPU 301 switches the LUTid and LUTb in accordance with the type of printing medium to be actually used when performing calibration. Even if the operator does not have the first printing medium X designated by the manufacturer, he can add a printing medium for calibration.

<Re-Creation (Updating) of LUTb>

In the above-described embodiment, only the LUTa is updated in every calibration. However, the LUTb may also be updated. The engine state of the printer unit B is generally adjusted to an ideal state by updating the LUTa. The LUTb basically needs not be updated. However, the calibration result varies to a certain degree. Strictly speaking, the state of the printing medium changes depending on the production lot or use environment. It can therefore create the LUTb again to perform calibration at higher precision. The re-created LUTb can cancel an error arising from the LUTa. That is, an error contained in the LUTb can be suppressed to one generated when calibration was performed once.

Figure 12A:
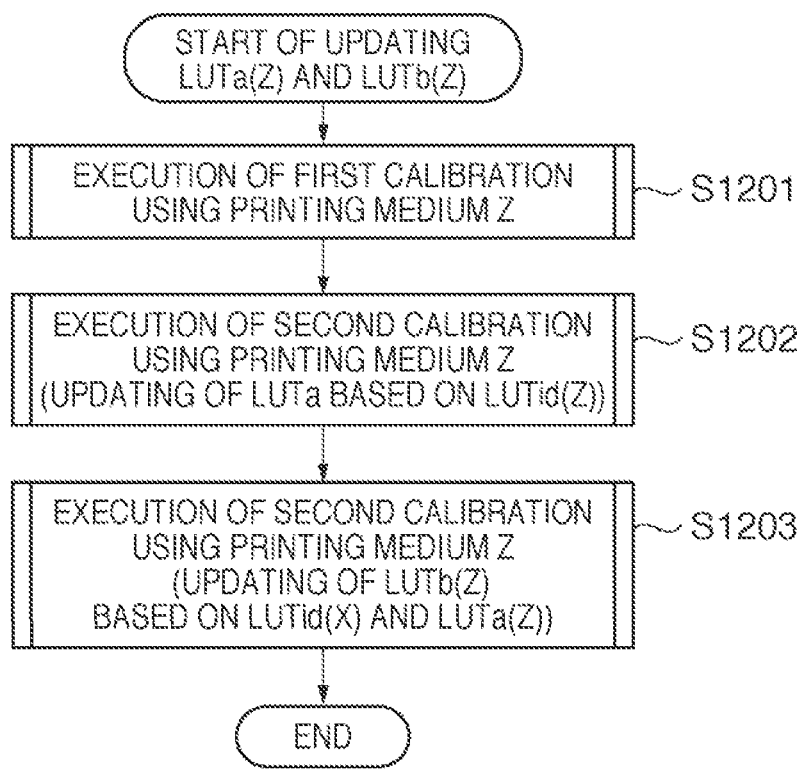
FIGS. 12A and 12B show flowchart showing update processing for the LUTa and LUTb and flowchart showing update processing for only the LUTb, respectively.

LUTb re-creation processing will be explained with reference to FIG. 12A. In step S1201, the CPU 301 performs the first calibration. In step S1202, the CPU 301 sets the LUTid(Z) in the color processing unit 303, and performs the second calibration using the printing medium Z, determining an LUTa. In step S1203, the CPU 301 sets the LUTid(X) in the color processing unit 303, sets the LUTa in the tone control unit 311, and performs the second calibration using the printing medium Z, determining an LUTb(Z). This embodiment increases the work time and labor by about 1.5 times, but improves calibration accuracy because the second calibration is done twice.

Figure 12B:
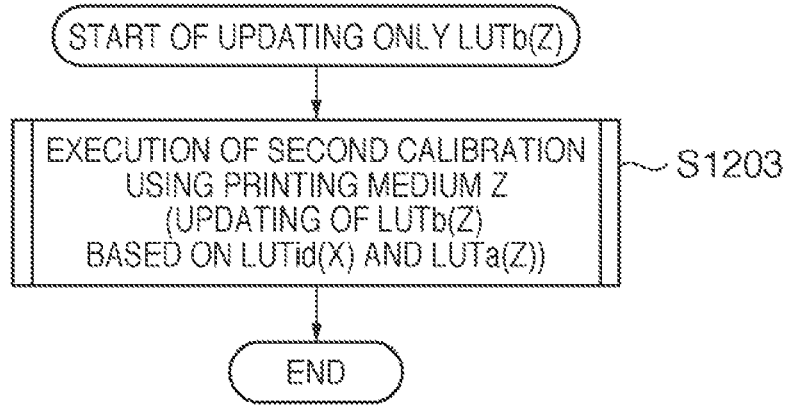

Note that only the LUTb may be updated without updating the LUTa. It suffices to perform only step S1203, as shown in FIG. 12B. The tone characteristic can be easily corrected by updating only the LUTb. In this case, however, density improvement or tone correction at a dark portion on a formed image may be further restricted. This is because the first calibration is omitted and no contrast is set. In addition, UCR processing is done for image signals, the sum of which becomes greater than or equal to a predetermined value. Even so, the advantage of easily adjusting the tone of a bright portion on the image is important.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-164348, filed Jul. 21, 2010 which is hereby incorporated by reference herein in its entirety.

What is claimed is:

1. An image forming apparatus comprising:
a correcting unit configured to correct image data using a tone correction condition and to generate corrected image data;
an image forming unit configured to form a pattern image on a printing medium based on the corrected image data;
an obtaining unit configured to obtain read data by a reading unit that reads the pattern image formed on the printing medium by the image forming unit;
a converting unit configured to convert the read data into density data using a converting condition corresponding to the printing medium;
a first creating unit configured to create the tone correction condition based on the density data converted by the converting unit; and
a second creating unit configured (i) to control the correcting unit to correct patch data using the tone correction condition created by the first creating unit, and to generate corrected patch data, (ii) to control the image forming unit to form a patch image on another printing medium based on the corrected patch data, and (iii) to create a converting condition corresponding to the other printing medium using patch read data obtained by the obtaining unit, the patch read data being obtained by the reading unit reading the patch image formed on the other printing medium,
wherein a converting condition corresponding to a specific printing medium is used for converting read data of a pattern image formed on the specific printing medium into density data related to the specific printing medium, and
wherein the converting condition corresponding to the other printing medium is used for converting read data of a pattern image formed on the other printing medium into density data related to the specific printing medium.

2. The image forming apparatus according to claim 1, further comprising:
a designating unit configured to designate a printing medium on which the image forming unit forms the pattern image; and
a selection unit configured to select a converting condition corresponding to the designated printing medium,
wherein the image forming unit is further configured to form the pattern image on the designated printing medium.

3. The image forming apparatus according to claim 1, wherein the converting condition corresponding to the other printing medium created by the second creating unit is stored by being associated with the other printing medium.

4. The image forming apparatus according to claim 1, wherein the image forming apparatus has an adding mode for adding the converting condition corresponding to the other printing medium, and wherein the second creating unit creates the converting condition corresponding to the other printing medium in the adding mode.

5. The image forming apparatus according to claim 4, wherein the tone correction condition used by the second creating unit during the adding mode is created by the first creating unit based on read data of a patch image formed on the specific printing medium.

6. The image forming apparatus according to claim 5, wherein the first creating unit is further configured to create the tone correction condition based on the read data of the patch image formed on the specific printing medium.

7. The image forming apparatus according to claim 1, wherein the other printing medium is of a different type than the specific printing medium.

8. The image forming apparatus according to claim 1, further comprising a storing unit configured to store the converting condition corresponding to the specific printing medium.

* * * * *